May 3, 1932.  F. WHEATLEY, SR  1,856,523
ROTARY ENGINE
Filed March 27, 1930   2 Sheets-Sheet 1
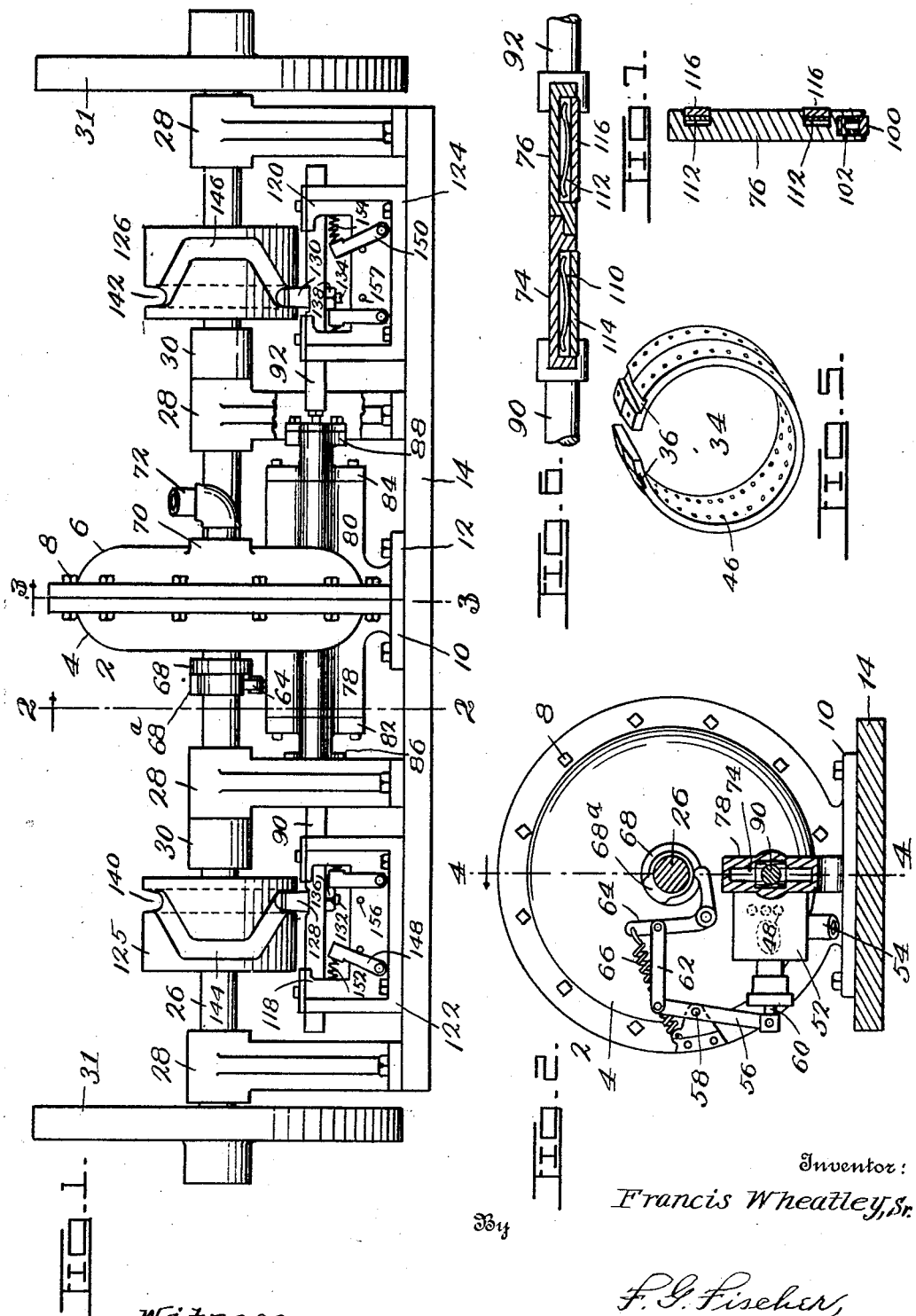
Inventor:
Francis Wheatley, Sr.
By
F. G. Fischer,
Attorney.
Witness:
Fred C. Fischer.

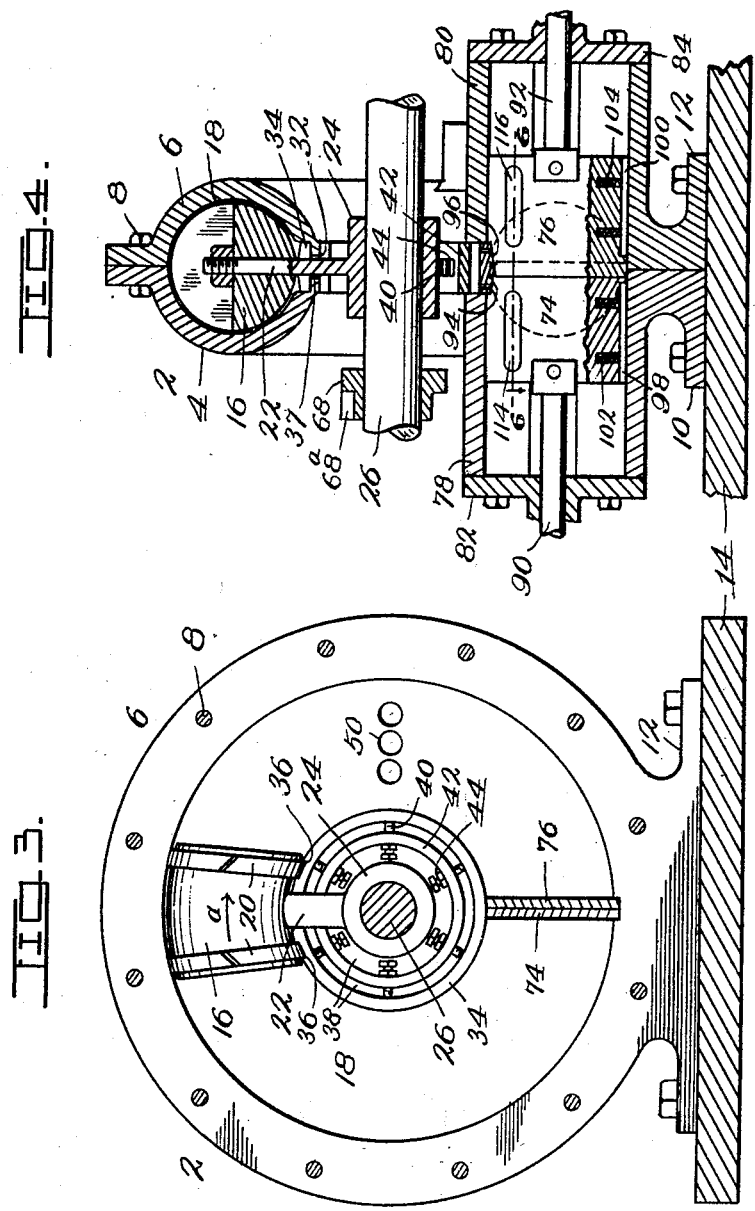

Patented May 3, 1932

1,856,523

UNITED STATES PATENT OFFICE

FRANCIS WHEATLEY, SR., OF KANSAS CITY, MISSOURI

ROTARY ENGINES

Application filed March 27, 1930. Serial No. 439,345.

My invention relates to a rotary steam engine and my object is to provide a relatively simple and inexpensive engine of this character in which the motive power is efficiently utilized.

A further object is to provide a rotary engine in which the working parts are automatically controlled, so that very little if any attention is required on the part of an attendant.

Another object is to provide novel packing means for preventing leakage of steam from the engine.

Other objects will hereinafter appear, and in order that the invention may be fully understood reference will now be had to the accompanying drawings, in which:

Fig. 1 is a front elevation of the engine with some of the parts broken away.

Fig. 2 is a vertical cross section on line 2—2 of Fig. 1.

Fig. 3 is a vertical section on line 3—3 of Fig. 1.

Fig. 4 is a vertical cross section on line 4—4 of Fig. 2.

Fig. 5 is a detail perspective view of a packing ring employed in carrying out the invention.

Fig. 6 is a broken horizontal section of a pair of gates on line 6—6 of Fig. 4.

Fig. 7 is a detail vertical section of one of the gates.

Referring in detail to the different parts, 2 designates the cylinder which consists of two sections 4 and 6 secured together by suitable means such as bolts 8. The sections 4 and 6 are provided at their lower portions with out-turned flanges 10 and 12 which are bolted or otherwise firmly secured to a base plate 14.

16 designates a rotary piston head which operates in an annular chamber 18 formed within the cylinder 2. Said piston head 16 is provided near each end with a split piston ring 20, which fits snugly within the chamber 18 to prevent the steam or other motive fluid from escaping past said piston head 16, which in the present instance is arranged to rotate in the direction of the arrow a, Fig. 3.

The piston head 16 is fixedly mounted upon a crank 22 projecting radially from a hub 24 fixedly mounted upon the engine shaft 26 which is journaled in a plurality of bearings 28 secured upon the base plate 14. The shaft 26 is prevented from shifting longitudinally within the bearings 28 by a pair of collars 30 fixedly mounted upon said shaft 26 and arranged adjacent to the intermediate bearings 28, Fig. 1. Fly wheels 31 are rigidly mounted upon the shaft 26 to impart a steady motion thereto.

The crank 22 extends through an annular slot 32 formed between the two cylinder sections 4 and 6. Said slot 32 is closed by a split packing ring 34 which is provided near its ends with transverse notches 36 into which the piston rings 20 project in order to cause said packing ring 34 to rotate with the piston head 16. The packing ring 34 travels upon annular shoulders 37 forming the sides of the slot 32. While the packing ring 34 snugly fits the shoulders 37 to prevent the motive fluid from escaping through the annular slot and out to atmosphere through a circular opening 38 in the central portion of the cylinder 2, said packing ring 34 is prevented from being forced too tightly into frictional contact with the shoulders 37 by suitable means such as a plurality of set screws 40 threaded in a split ring 42 which is spaced from but arranged concentrically within the packing ring 34, Fig. 3.

After being adjusted into engagement with the inner periphery of the packing ring 34 the set screws 40 are firmly secured by locknuts 44 which are adjusted into engagement with the inner periphery of the split ring 42, the ends of which latter abut opposite sides of the crank 22 in order to rotate therewith. The packing ring 34 is provided with a plurality of small transverse openings 46 through which oil admitted to the chamber 18 may pass between the inner periphery of said packing ring 34 and the shoulders 37, for the purpose of lubricating the same and preventing undue wear.

Steam or other motive fluid for driving the piston head 16 is admitted to the annular chamber 18 through inlet ports 48 formed in the lower portion of the cylinder section 4 and escapes through exhaust ports 50 formed in the cylinder section 6. The inlet ports 48 communicate with a chest 52 which is supplied with motive fluid through an inlet pipe 54. The chest 52 contains a suitable valve, not shown, for admitting the motive fluid to the inlet ports 48 and said valve may be controlled by any suitable mechanism.

In the present instance I have shown such mechanism consisting of a lever 56 mounted upon a fulcrum 58 and connected at one end to the valve stem 60 and at its other end to one end of a link 62, which is connected at its opposite end to a bell-crank 64 held by a coil spring 66 in engagement with a cam 68 fixedly mounted upon the engine shaft 26.

The exhaust ports 50, which are always open, communicate with a compartment 70 from which an exhaust pipe 72 leads to atmosphere.

In order to cause the motive fluid to travel in the direction of the arrow $a$, Fig. 3, in its passage through the chamber 18 from the inlet ports 48 to the outlet ports 50, I provide a pair of gates 74 and 76, which are adapted to close the lower portion of said annular chamber 18 at a point adjacent to the rear of the inlet ports 48.

As more clearly shown by Fig. 4, the gates 74 and 76 are reciprocably mounted in housings 78 and 80 which are preferably formed integral with the lower portions of the cylinder sections 4 and 6 and provided with removable caps 82 and 84 equipped with stuffing-boxes 86 and 88 through which the stems 90 and 92 of the gates 74 and 76, respectively, project.

The adjacent ends of the gates 74 and 76 are arranged to overlap when closed, as shown by Fig. 6, and thus form a steam-tight joint and their upper adjacent portions are recessed as indicated at 94 and 96 to snugly fit against the packing ring 34 and form a steam-tight joint.

Leakage of motive fluid around the upper and lower edges of the gates 74 and 76 is overcome by packing elements 98 and 100 and springs 102 and 104, respectively. The packing elements 98 and 100 are arranged in grooves in the lower portions of the gates 74 and 76 and are forced downwardly against the bottoms of the housings 78 and 80 by said springs 102 and 104, which latter also force the gates 74 and 76 against the upper portions of the respective housings 78 and 80.

As a further precaution against the leakage of steam around the gates 74 and 76 the sides of said gates nearest the inlet ports 48 are pressed against the adjacent sides of the housings 78 and 80 by means of springs 110 and 112, which also press packing elements 114 and 116 against the opposite sides of the housings 78 and 80, respectively.

The outer portions of the stems 90 and 92 are reciprocably mounted in slideways 118 and 120 in the upper portions of brackets 122 and 124 mounted upon the base plate 14. Said stems 90 and 92 are reciprocated by means of cams 125 and 126 and antifriction rollers 128 and 130, which latter are mounted upon spindles 132 and 134 secured to the stems 90 and 92 by nuts 136 and 138, respectively. The rollers 128 and 130 are upwardly tapered and extend into peripheral grooves 140 and 142 formed in the respective cams 125 and 126. Said grooves 140 and 142 have lateral extensions 144 and 146 which on engaging the rollers 128 and 130 cause the latter to open the gates 74 and 76 through the intermediary of the stems 90 and 92 to permit the piston head 20 to pass, after which they immediately close said gates.

In order to prevent undue wear upon the rollers 128 and 130 when contacted by the walls of the angular portions of the lateral extensions 144 and 146, I provide cushioning means consisting of arms 148 and 150 and springs 152 and 154, Fig. 1. The arms 148 and 150 are pivotally mounted upon the brackets 122 and 124 and are spaced apart at opposite sides of the nuts 136 and 138 whereby they are alternately contacted to compress the respective springs 152 and 154. The springs 152 and 154 are interposed between the brackets 122 and 124 and the arms 148 and 150 and normally hold the latter against stops 156 and 157 projecting from the brackets 122 and 124, respectively.

In practice the greater periphery 68$a$ of the cam 68 is arranged to open the inlet valve for the admission of steam to the annular chamber 18 immediately after the piston head 20 has passed the inlet ports 48, and holds said inlet valve open until the piston head 20 has traveled about a third of a revolution, whereupon the valve is closed and remains in such position until the piston head 16 again passes the inlet ports 48. The mechanism for controlling the gates 74 and 76 is arranged to open the latter only long enough to permit the piston head 16 to pass, after which said gates are closed to form an abutment across the chamber 18 and compel the motive fluid to travel in the direction of the arrow $a$, Fig. 3.

From the foregoing description it is apparent that I have provided an engine embodying the advantages above pointed out, and while I have shown and described the preferred construction, combination and arrangement of parts I reserve the right to all such changes and modifications as properly fall within the spirit and scope of the invention as claimed.

Having thus described my invention, what I claim and desire to secure by Letters Patent, is:

1. In an engine of the character described, a cylinder having an annular chamber and an annular slot which latter extends through the inner periphery of said chamber, annular shoulders within said cylinder and arranged at opposite sides of said annular slot, a split packing ring bridging said slot and mounted upon said annular shoulders, means for regulating the pressure of said packing ring upon the annular shoulders, a piston head arranged to traverse the annular chamber, packing rings mounted upon said piston head and projecting into notches in the first-mentioned packing ring, a member carrying the piston head and extending through the annular slot and between the ends of the packing ring, and a shaft extending transversely through the axis of the annular chamber and upon which said member is mounted.

2. In an engine of the character described, a cylinder having an annular chamber and an annular slot which latter is adjacent to the inner periphery of said chamber, a packing ring bridging said slot and mounted upon the annular shoulders, a one-piece ring spaced within said packing ring, manually adjustable elements threaded in the last-mentioned ring and engaging the packing ring to regulate the pressure thereof upon said annular shoulders, a piston head arranged to traverse the annular chamber and rotate said packing ring, a member extending through the annular slot and upon which said piston head is mounted, and a shaft extending transversely through the annular chamber and upon which said member is mounted.

3. In an engine of the character described, a cylinder having an annular chamber, a piston head arranged to traverse said chamber, a shaft to which said piston head is suitably connected, a pair of gates associated with said chamber, stems connected to said gates, brackets in which said stems are reciprocably mounted, spindles secured to said stems, antifriction rollers mounted upon said spindles, and grooved cams mounted upon the shaft and engaging said rollers for shifting the same and the gates to and from a position in which said gates form a transverse abutment across said annular chamber, a pair of arms pivotally mounted upon each bracket and arranged in the path of the adjacent spindle, and spring means interposed between the free ends of said arms and the brackets.

In testimony whereof I affix my signature.

FRANCIS WHEATLEY, Sr.